(12) United States Patent
Mitchell et al.

(10) Patent No.: US 9,189,556 B2
(45) Date of Patent: Nov. 17, 2015

(54) SYSTEM AND METHOD FOR DISPLAYING INFORMATION LOCAL TO A SELECTED AREA

(75) Inventors: Henry Hiroshi Mitchell, San Jose, CA (US); Shun Ikejima, Tokyo (JP); Naoki Iwasaki, Tokyo (JP)

(73) Assignee: Google Inc., Mountain View, CA (US)

( * ) Notice: Subject to any disclaimer, the term of this patent is extended or adjusted under 35 U.S.C. 154(b) by 728 days.

(21) Appl. No.: 13/345,635

(22) Filed: Jan. 6, 2012

(65) Prior Publication Data
US 2013/0176321 A1 Jul. 11, 2013

(51) Int. Cl.
*G06F 17/30* (2006.01)
*G09B 29/00* (2006.01)
*G01C 21/36* (2006.01)

(52) U.S. Cl.
CPC ........ *G06F 17/3087* (2013.01); *G01C 21/3682* (2013.01); *G09B 29/007* (2013.01)

(58) Field of Classification Search
CPC .............. G09B 29/007; G01C 21/367; G01C 21/3682; G06F 17/3087; G06T 11/60
USPC .......................... 340/988–996; 715/764–865; 345/156–184, 619–689
See application file for complete search history.

(56) References Cited

U.S. PATENT DOCUMENTS

| | | | | |
|---|---|---|---|---|
| 5,712,830 A * | 1/1998 | Ross et al. | | 367/93 |
| 5,852,810 A * | 12/1998 | Sotiroff et al. | | 705/26.8 |
| 2002/0163547 A1* | 11/2002 | Abramson et al. | | 345/855 |
| 2005/0034062 A1* | 2/2005 | Bufkin et al. | | 715/512 |
| 2005/0268254 A1* | 12/2005 | Abramson et al. | | 715/855 |
| 2007/0011150 A1* | 1/2007 | Frank | | 707/4 |
| 2007/0256026 A1* | 11/2007 | Klassen et al. | | 715/764 |
| 2008/0004993 A1* | 1/2008 | Horspool et al. | | 705/28 |
| 2008/0027799 A1* | 1/2008 | Hao et al. | | 705/14 |
| 2008/0084473 A1* | 4/2008 | Romanowich | | 348/135 |
| 2009/0055087 A1 | 2/2009 | Beacher | | |
| 2009/0158309 A1* | 6/2009 | Moon et al. | | 725/12 |
| 2009/0160873 A1* | 6/2009 | Kew et al. | | 345/629 |
| 2009/0196206 A1* | 8/2009 | Weaver et al. | | 370/310 |
| 2009/0281720 A1* | 11/2009 | Jakobson | | 701/202 |
| 2010/0057337 A1* | 3/2010 | Fuchs | | 701/200 |
| 2010/0138796 A1* | 6/2010 | Abramson et al. | | 715/855 |

(Continued)

FOREIGN PATENT DOCUMENTS

| | | |
|---|---|---|
| JP | 2006-065685 A | 3/2006 |
| KR | 10-2005-0000225 | 1/2005 |
| WO | WO 2011/013603 | 2/2011 |

OTHER PUBLICATIONS

Redfin—Search Homes for Sale & Find Real Estate Agents Who Put You First, retrieved from http://www.redfin.com on Feb. 8, 2012—1 page.

(Continued)

*Primary Examiner* — Hai Phan
*Assistant Examiner* — Orlando Bousono
(74) *Attorney, Agent, or Firm* — Dority & Manning, P.A.

(57) ABSTRACT

A system and method of the subject technology displays non-geographic information associated with a viewed point of interest in an interactive internet map. When the map is repositioned by a user, a new point of interest is determined based on one or more coordinates and one or more predefined rules, and new non-geographic information is automatically generated and displayed for the new point of interest, all without a user having to enter search criteria.

18 Claims, 6 Drawing Sheets

(56) References Cited

U.S. PATENT DOCUMENTS

| | | |
|---|---|---|
| 2010/0146436 A1 | 6/2010 | Jakobson |
| 2010/0235096 A1* | 9/2010 | Miyagi ............... 701/209 |
| 2010/0240415 A1* | 9/2010 | Kim et al. ............ 455/565 |
| 2011/0035271 A1* | 2/2011 | Weaver et al. ........ 705/14.41 |
| 2011/0122153 A1* | 5/2011 | Okamura et al. ...... 345/629 |
| 2011/0161861 A1* | 6/2011 | Abramson et al. ..... 715/781 |
| 2011/0161872 A1* | 6/2011 | Abramson et al. ..... 715/800 |
| 2011/0228984 A1* | 9/2011 | Papke et al. ......... 382/103 |
| 2011/0231419 A1* | 9/2011 | Papke et al. ......... 707/756 |
| 2011/0254877 A1* | 10/2011 | Mowry et al. ........ 345/690 |
| 2011/0257877 A1* | 10/2011 | Liu et al. ............ 701/201 |
| 2011/0302029 A1 | 12/2011 | Harmon |
| 2012/0030568 A1* | 2/2012 | Migos et al. ......... 715/702 |
| 2012/0120115 A1 | 5/2012 | Sato |

OTHER PUBLICATIONS

EP Search Report for corresponding EP Application No. 12 86 4625, mailed on Aug. 20, 2015—3 pages.

* cited by examiner

SYSTEM AND METHOD FOR DISPLAYING INFORMATION LOCAL TO A SELECTED AREA

TECHNICAL FIELD

The subject technology relates generally to search engines, namely, a search in connection with an interactive internet map.

BACKGROUND

Some search engines may include, in connection with a search input, an interactive internet map displayed within a computer-enabled interactive viewport (for example, in a region of a web browser). A user may input a point of interest (for example, a geographic location) as a text query to view the point of interest in the internet map, along with non-geographic information related to the viewed point of interest. This manual process may then be repeated to view non-geographic information relevant to other points of interest.

SUMMARY

The subject technology provides a computer implemented method for updating non-geographic location information relating to a displayed geographic location in a viewport is disclosed. In one aspect, the method may include providing for display, non-geographic information related to a currently displayed point of interest in an interactive map, determining a user has repositioned the interactive map, automatically determining a new geographic point of interest displayed on the repositioned interactive map based on information received from the interactive map and a predefined rule, automatically determining new non-geographic information related to the new geographic point of interest, and providing, for display, the new non-geographic information related to the new geographic point of interest. In some aspects, determining the user has repositioned the interactive map includes determining the user has repositioned the interactive map by more than a predetermined amount (for example, by a dragging, panning, or zooming action). In other aspects, the information from the interactive map may include one or more coordinates.

In another aspect, a machine-readable medium may include machine-executable instructions for updating non-geographic location information relating to a geographic location in a displayed interactive map. In this regard, the method may include providing for display, the interactive map, and non-geographic information related to a current point of interest in the interactive map, determining the interactive map has been repositioned, on determining the interactive map has been repositioned more than a predetermined amount, automatically determining a new point of interest in the interactive map based on a displayed area and a predefined rule, automatically determining new non-geographic information related to the new point of interest, and providing to the user interface, updated non-geographic information based on the new point of interest.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Interactive maps (for example, internet maps, three-dimensional representations of the Earth, and the like) do not automatically update and display non-geographic information (for example, facts, details and/or images related to events, businesses, news, tourism, local trends, advertising, and the like) as they are repositioned by a user. For example, if a user is viewing a point of interest on a map (for example, a city), but pans the map to a new point of interest, without inputting any additional search criteria, the original information regarding the original point of interest remains displayed. To solve this problem, the subject technology provides a system and method that automatically generates non-geographic information relevant to a newly determined point of interest (for example, a geographic location and/or an area surrounding a location on the map) on repositioning and/or a re-rendering of the map, all without a user having to enter search criteria.

In one aspect, a user may enter a text query into a search engine to obtain a display of a geographic point of interest in an interactive map, along with non-geographic information related to the viewed geographic point of interest. When the user (for example, via manual action) repositions the map, one or more geographic coordinates may be passed to a processor or server that generates the map. The server may automatically determine an area a new point of interest on the map, in accordance with the one or more coordinates and a predefined rule, and then retrieve new non-geographic information associated with the newly determined point of interest from a database or other storage location. In this manner, the display may automatically be updated with the new non-geographic information as the map is updated, for example, while the user is panning from one location to another.

Figure 1:
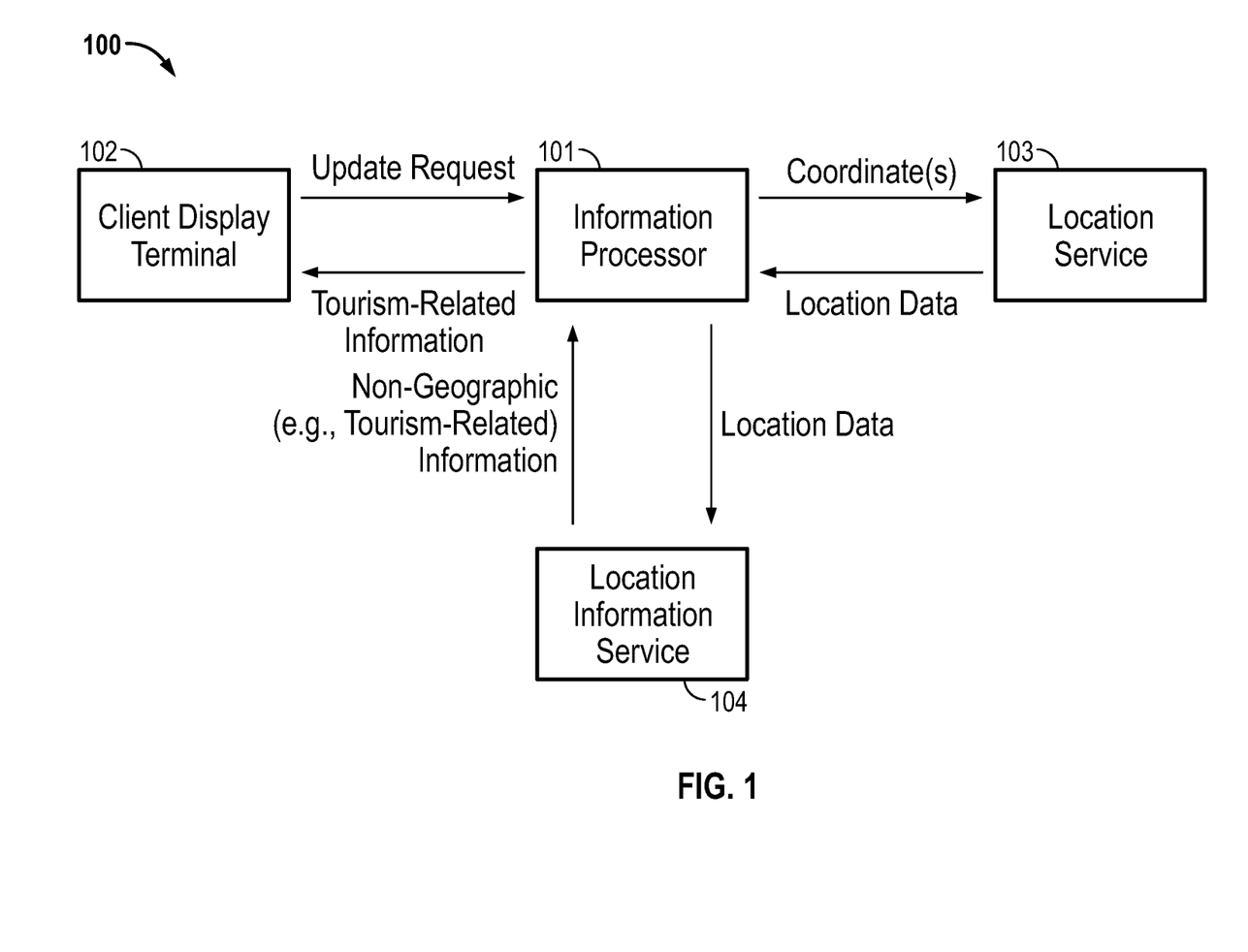
FIG. 1 is an exemplary diagram of a system for displaying non-geographic information associated with a viewed area of interest, including a user interface and a geographic information processor for automatically determining the area of interest, according to one aspect of the subject technology.

FIG. 1 is an exemplary diagram of a system for displaying non-geographic information associated with a viewed point of interest, including a user interface and a geographic information processor for automatically determining the point of interest, according to one aspect of the subject technology. System 100 includes a geographic information processor 101 for processing geographic-related information received from a client display terminal 102, and for generating geographic and local information for display at client display terminal 102. In one aspect, client display terminal 102 and information processor 101 may be integrated in a computer-enabled device (for example, a personal computer, tablet computer, server, PDA, smart phone, or the like). In this regard, information processor 101 may include software instructions executable by the computer-enabled device that, when executed, configures the computer-enabled device to perform the operations and functionality described herein.

In another aspect, information processor 101 and display terminal 102 may exist as separate devices that communicate over a wired or wireless connection. Client display terminal 102 may include a client device configured to display, on a display screen, a viewport (for example, a region within a web browser configured to display information using HTML, Java, .NET, Javascript, or the like). Information processor 101 may include a server and/or microprocessor configured to receive display information from client display terminal 102 over the wired or wireless connection, and to execute code or instructions to perform the operations and functionality described herein (see, for example, FIG. 6).

Client display terminal 102 may be configured to display an interactive map and an information panel for displaying a set of elements related to a displayed portion of the interactive map. In some aspects, client display terminal 102 may include instructions for determining when the interactive map is repositioned (for example, moved as a result of a dragging, panning, or zooming action), and, on being repositioned more than a predetermined amount, send one or more update requests to information processor 101. The one or more update requests may include viewport information, including a center coordinate and/or one or more other coordinates, area bounds, zoom level, and/or the like.

Information processor 101 and client display terminal 102 may communicate with each other via a network using HTTP request/response, XMLHttpRequest (XHR), or the like. For example, when the map is moved, client display terminal 102 may request a new portion of the map via a POST or GET operation including one or more URL parameters. The one or more URL parameters may, for example, include coordinates, direction of pan, a request to query or re-query information, a request for partial query, indicate whether the query is a geocode query (map location information) or a localsearch query (for example, geographic and/or non-geographic information associated with a location), and/or the like. In another aspect, XHR may be used (for example, via AJAX and/or a scripting language) to request and load a virtual page including map information and/or non-geographic information (for example, as a set of elements). In this aspect, history information (for example, as maintained by a web browser) may not be updated by the request.

In some aspects, information processor 101 may be configured to receive a map information update request and use the data therein to query a location service 103 for location data. Information processor may then use the received location data to query a local information service 104 for non-geographic information relevant to the location. In this regard, to determine a point of interest displayed on the map (for example, a location that is the presumed focus point and/or location of a user interacting with the map), information processor 101 may send viewport information, including one or more coordinates to location service 103. In some aspects, information processor 101 may only process viewport information if it determines that a current point of interest has likely changed. In one example, information processor 101 may compare coordinates in the current viewport information with stored coordinates received as part of a previous update request, and process the current viewport information if the map has been repositioned more than a predetermined amount.

Location service 103 may receive and process one or more coordinates to generate one or more points of interest. In one aspect, the one or more coordinates may include a center coordinate of the displayed map. In another aspect, the one or more coordinates may include a coordinate generated, for example, by product of a prior coordinate and a vector of the direction and distance of a panning action generated by the interaction between the interactive map and a pointing device or keystroke at client display terminal 102. The viewport information may also include one or more other coordinates within an area surrounding the center coordinate (for example, within an area defined by a polygon about a geographic coordinate). The displayed point of interest may be reverse geocoded from the viewport information by location service 103, which may be configured to determine the point of interest by querying a database and/or location service using the one or more coordinates. Geographic points of interest (for example, one or more cities, counties, and/or states) may be stored in the queried database and indexed by coordinate values and/or a range of coordinates. In other aspects, location service 103 may query a web service (for example, on a remote server) to retrieve the geographic point of interest. Once the geographic point of interest has been retrieved and/or determined, location service 103 may return it to information processor 101.

One skilled in the art will understand that it is not necessary that the point of interest be determined by location service 103. For example, a processor displaying a user interface at client display terminal 102 may determine one or more points of interest from information included within the viewed interactive map and/or provided with the previously described viewport information. In another aspect, the point of interest may be determined by a location entered by a user at a search input on client display terminal 102. Once the point of interest is received by information processor 101, it may be passed directly to local information service 104.

Local information service 104 may be configured to provide non-geographic information based on the previously described point of interest. For example, non-geographic information may include local trends, information on businesses at or proximal to the point of interest, photos, tourism information, advertisements associated with the point of interest, and/or the like. In one aspect, the non-geographic information provided may not be tied to a specific point on a map. Rather, the information may be related to the point of interest to the extent it imparts information pertaining to the point of interest.

Figure 2:
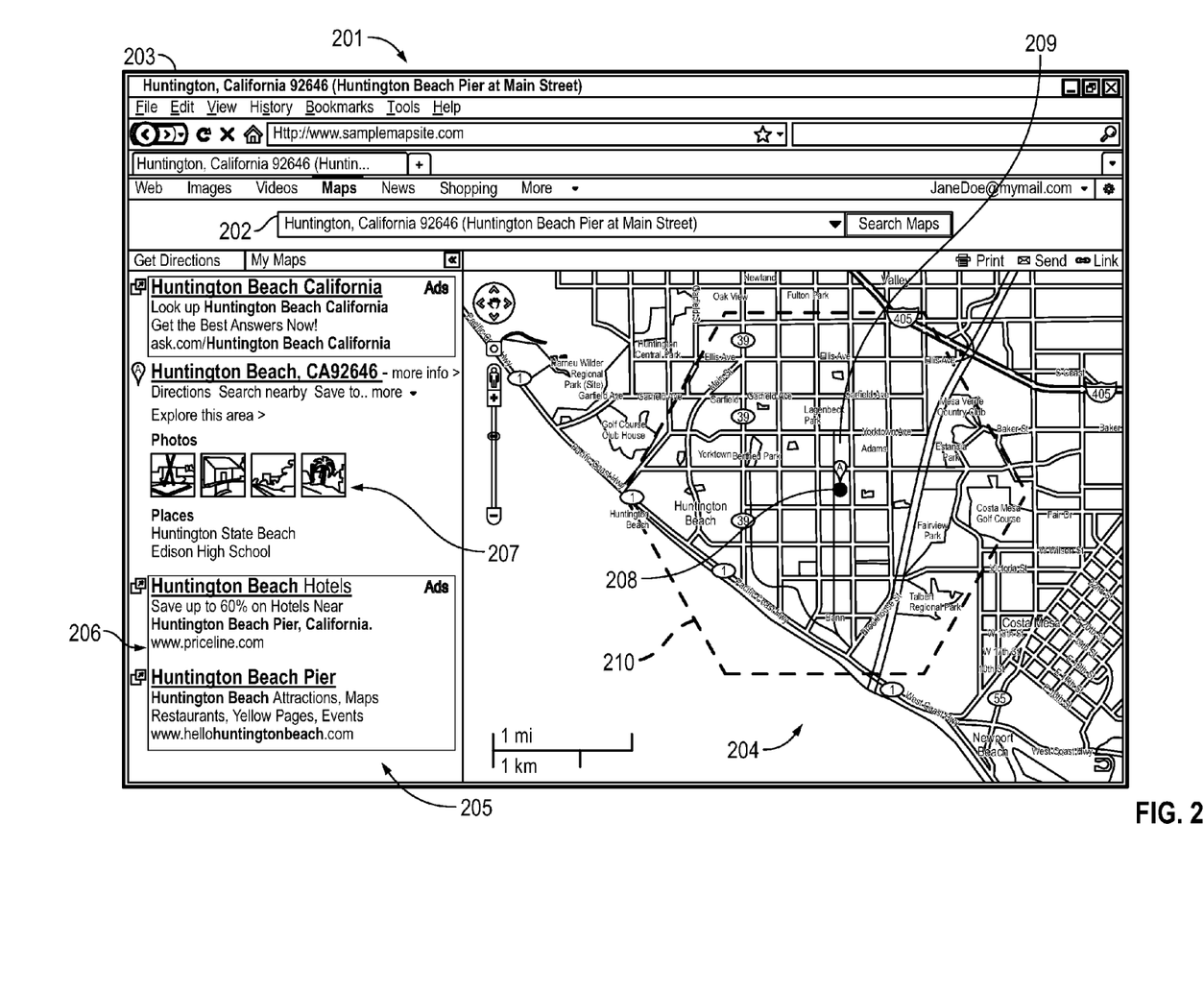
FIG. 2 is an exemplary diagram of a user interface, including an interactive geographic representation and a display of non-geographic information associated with a viewed location, according to one aspect of the subject technology.

The non-geographic information may be stored in a database associated with local information service 104, indexed by geographic points of interest. In this regard, local information service may receive one or more geographic points of interest (for example, from information processor 101 or location service 103) and then perform a lookup of one or more elements of non-geographic information to be returned to client display terminal 102, for example, to be displayed in adjacent window 205. In some aspects, local information server 104 may act as an intermediary between information processor 101 and the database or other information source. In one example, local information service 104 may query a web service (for example, on a remote server) to retrieve the information.

Figure 6:
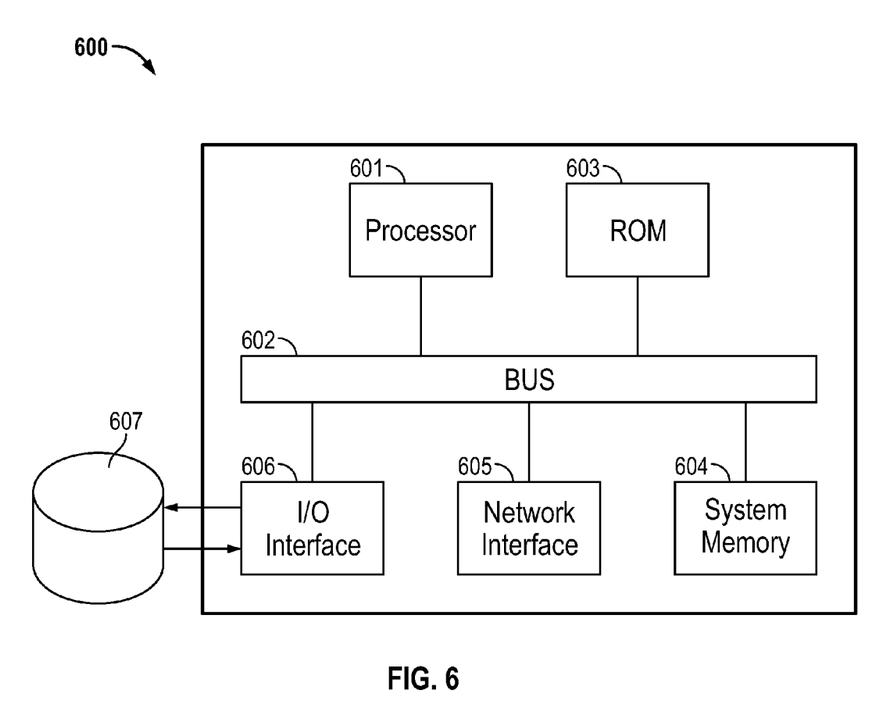
FIG. 6 is a diagram illustrating an exemplary computerized system for displaying non-geographic information associated with an area of interest, including a processor and other internal components, according to one aspect of the subject technology.

In one aspect, location service 103 and/or local information service 104 may include a processor configured to execute code or instructions to perform the operations and functionality described herein (see, for example, FIG. 6). In another aspect, location service 103 and/or local information service 104 may include software (for example, a web service) executable by a computer-enabled device (for example, a server, personal computer, tablet computer, PDA, smart phone, GPS device, or the like) that, when executed, configures the computer-enabled device to receive requests from information processor 101 and to perform the operations and functionality described herein.

FIG. 2 is an exemplary diagram of a user interface, including an interactive internet map and a display of non-geographic information associated with a point of interest 209 displayed within the interactive map. As depicted, a user interface 201 (for example, a web browser) may include a search query input 202, a primary window 203 including an interactive map 204, and an adjacent window 205 displayed along a side of primary window 203. Adjacent window 205 may include, for example, local trends, tourism information 206, information on businesses at or proximal to an area of interest 210 surrounding the point of interest 209, photos 207, advertisements associated with the point of interest 209, and/or the like. In one aspect, the information displayed in adjacent window 205 may be associated with a geographic area of interest 210 returned by local information service 104, as described previously. In other aspects, the information may be retrieved as a result of a search query input at search query input 202 (for example, from a search for a geographic location).

One or more geographical coordinates may be stored, for example, in a memory associated with primary window 203, and included with the viewport information passed to information processor 101 when interactive map 204 is updated and/or repositioned within primary window 203. The geographical coordinates may be representative of actual geographic location such as latitude and longitude coordinates and/or altitude information, GPS position information, cartography data, or the like. The graphical coordinates may or may not be visually displayed by primary window 203.

In one aspect, point of interest 209 may be determined by information processor 101 and/or location service 103 as a function of an area displayed in primary window 203 and a predefined rule. The predefined rule may include choosing as the point of interest 209 a geographic location closest to one or more coordinates received with the viewport information, including, for example, a coordinate representative of a geographic location 208 at the center of primary window 203. Additionally or in the alternative, a predefined rule may include choosing as the point of interest a geographic entity (for example, in the displayed viewport) having the largest population and/or geographic size (for example, square miles), or a population and/or geographic size over a threshold value.

The predefined rule may also include choosing as the point of interest a geographic entity having an attribute (for example, population) whose value is greater than the average value of that attribute taken over a plurality of geographical entities displayed in the viewport. The attribute value may be a population and/or a number of square miles, however, other attribute values may be used to identify a geographic entity as a point of interest. The geographic entity may also be determined by other data, including population density, business or building density, number or density of tourism spots, traffic trends, number of advertisements associated with one or more locations viewed, and/or the like.

The geographic point of interest 209 returned from location service 103 may be bounded (for example, limited) by an area of interest 210 surrounding the point of interest. In some instances, a portion of the area of interest 210 may not be displayed by primary window 203. In the depicted example, area of interest 210 is in the shape of a polygon, however, area of interest 210 may also be in the shape of a circle, square, triangle, hexagon, octagon, or other shape.

In one aspect, information processor 101 may use area of interest 210 to query location information service 104 for non-geographic information. In another aspect, information processor 101 may use area of interest 210 to filter results returned from location information service 104. For example, the primary window 203 may be used to retrieve non-geographic information from location information service 104, and then only the non-geographic information that is within area of interest 210 may be displayed at primary window 203.

Figure 3:
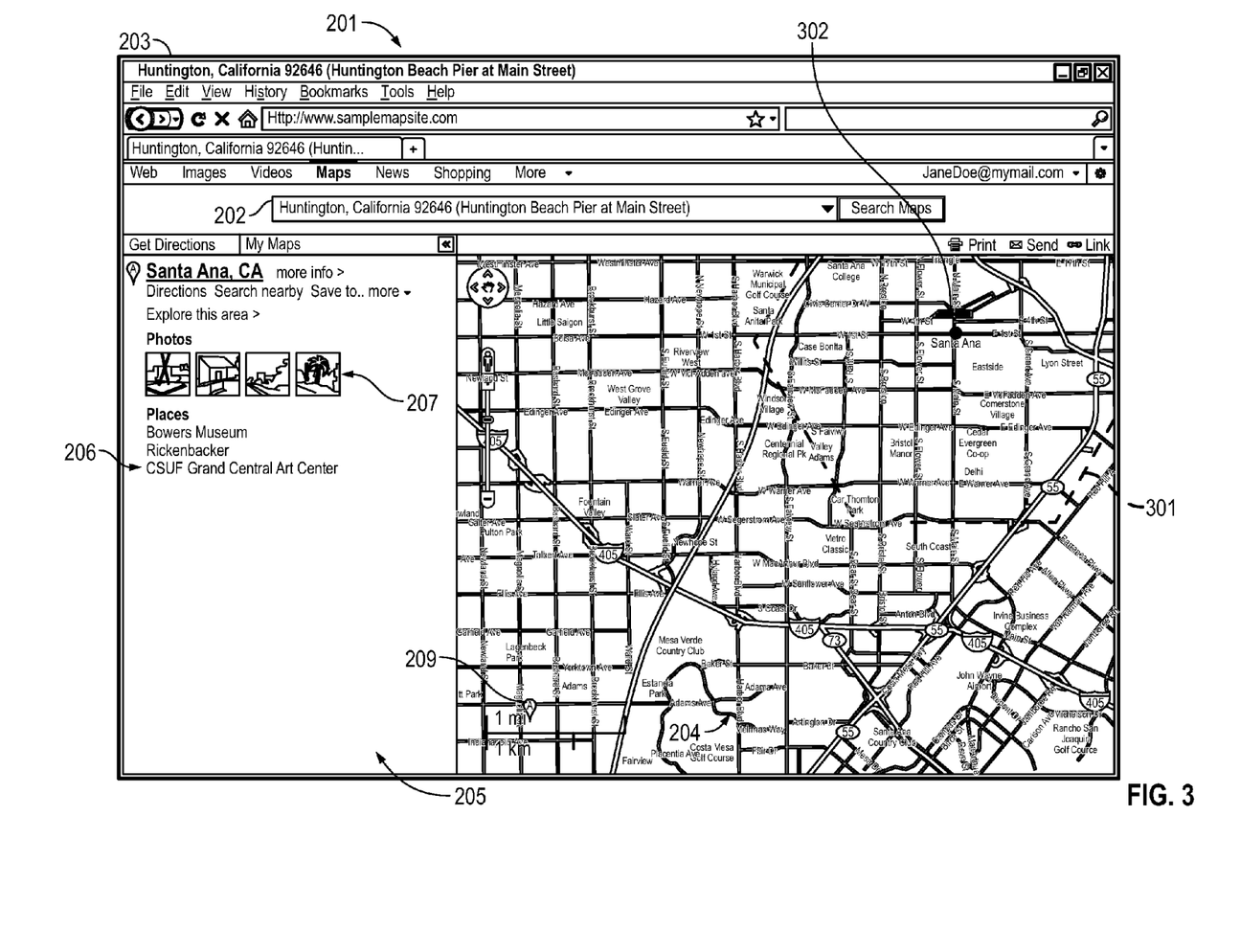
FIG. 3 is an exemplary diagram of a user interface, including a repositioned location in an interactive geographic representation and a display of non-geographic information associated with the repositioned location, according to one aspect of the subject technology.

FIG. 3 is an exemplary diagram of a user interface, including the interactive map shown in FIG. 2 repositioned to display a new point of interest 302, and a display of non-geographic information associated with the new point of interest 302. The new point of interest 302 is determined from the interactive map 204 when the interactive map 204 is repositioned. As described previously, interactive map 204 may be repositioned by a user dragging, panning, or zooming the interactive map. Alternatively, interactive map 204 may be automatically repositioned. For example, interactive map 204 may be displayed on a GPS-enabled device (for example, a smart phone or navigation unit) that updates map 204 in real-time as the device is moved in three-dimensional space. As interactive map 204 is repositioned, a new point of interest 302 and surrounding area of interest 210 may be determined from primary window 203 and a rule as described above.

When primary window 203 is updated, for example, on a repositioning of interactive map 204, part of the area of interest 210 may not be displayed by primary window 203. In one aspect, as depicted by FIG. 3, a truncated area 301 may be defined by an intersection of area of interest 210 (for example, as defined by a polygon in FIG. 2) and primary window 203. Accordingly, information returned by local information service 104 (for example, via information processor 101) that is outside truncated area 301 may be excluded. For example, if interactive map 204 is repositioned from displaying a first city (for example, Huntington Beach as displayed in FIG. 2) to displaying a second city (for example, Santa Ana as displayed in FIG. 3), the second city may be selected as the new point of interest according to the previously described predefined rule. The area of interest 210 surrounding the new point of interest may be a truncated area 301 as discussed above. Search results returned from local information service 104 for the new point of interest may exclude search results that are not displayed in primary window 203 (for example, search results outside of truncated area 301).

Figure 4:
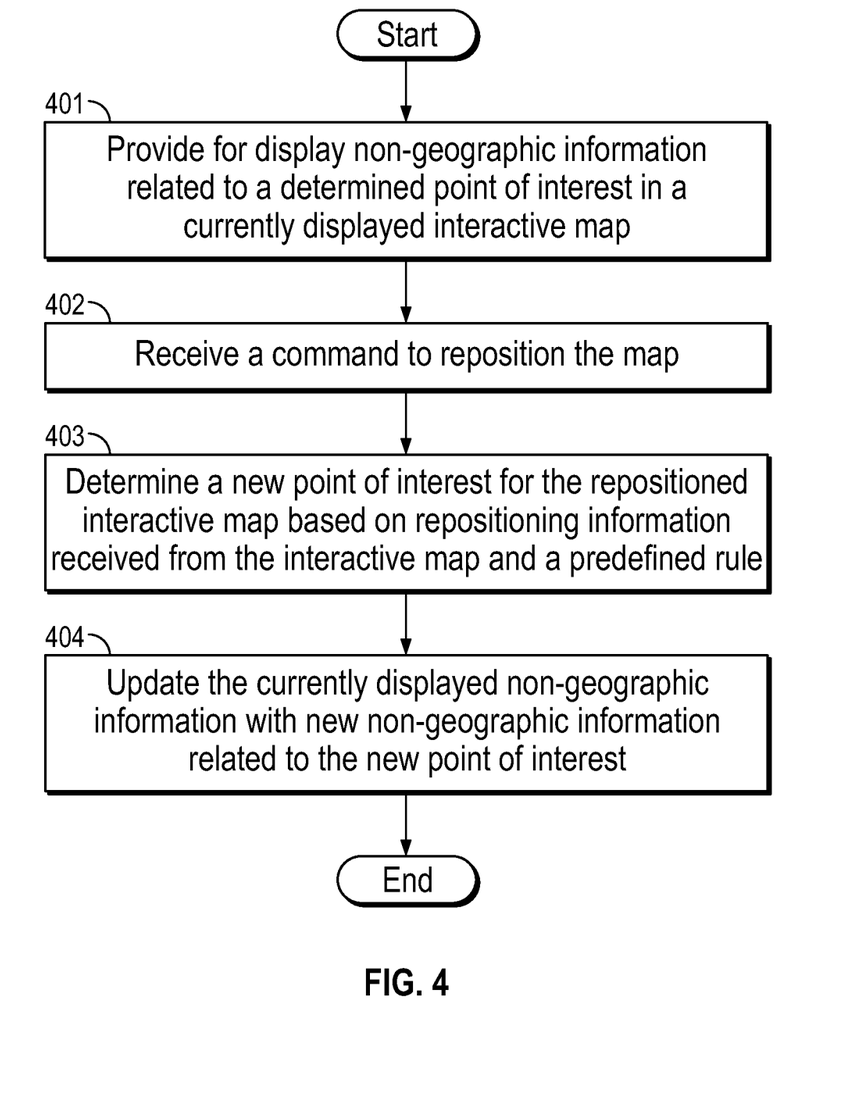
FIG. 4 is a flowchart illustrating an exemplary process for displaying non-geographic associated with an area of interest according to one aspect of the subject technology.

FIG. 4 is a flowchart illustrating an exemplary process for displaying non-geographic information associated with an area of interest according to one aspect of the subject technology. In step 401, non-geographic information related to a determined point of interest in a currently displayed interactive map is provided for display. In this regard, the system may display the interactive map, the determined point of interest, and non-geographic information related to related to the current point of interest and based on a text search. The interactive map may be displayed in a primary window of a user interface, and the non-geographic information may be displayed in an adjacent window. Alternatively, or in addition, the non-geographic information may be displayed in the primary window (for example, as icons on the map). In one aspect, the current point of interest may be a geographic location at the center of a displayed portion of the interactive map, or may be determined from the contents of the map and a given rule. As previously described with regard to FIG. 2, the non-geographic information may include, for example, local trends, tourism information, information on businesses at or proximal to the area, photos, advertisements associated with the geographic area of interest, and/or the like.

In step 402, the system may receive a command to reposition the map. The command, for example, may result from a user panning, dragging, or zooming the map within a web browser or other application suitable for viewing and interacting with the map. On determining a user has repositioned the interactive map, in step 403, a new point of interest for the repositioned interactive map is determined based on repositioning information received from the interactive map and a predefined rule. In some embodiments, the system may determine whether the map has been substantially repositioned, for example, by a predetermined number of pixels or distance, prior to determining a new point of interest for the repositioned map. On determining a new point of interest for the repositioned interactive map, in step 404, the currently displayed non-geographic information is updated with new non-geographic information related to the new point of interest. In one aspect, generating new non-geographic information may include querying one or more data sources for the new non-geographic information, for example, as previously described with regard to FIG. 1. Once the new non-geographic information has been generated, the display is updated with the new non-geographic information. As previously described, updating the non-geographic information may include updating a window, in a user interface, responsible for display of the information.

Figure 5:
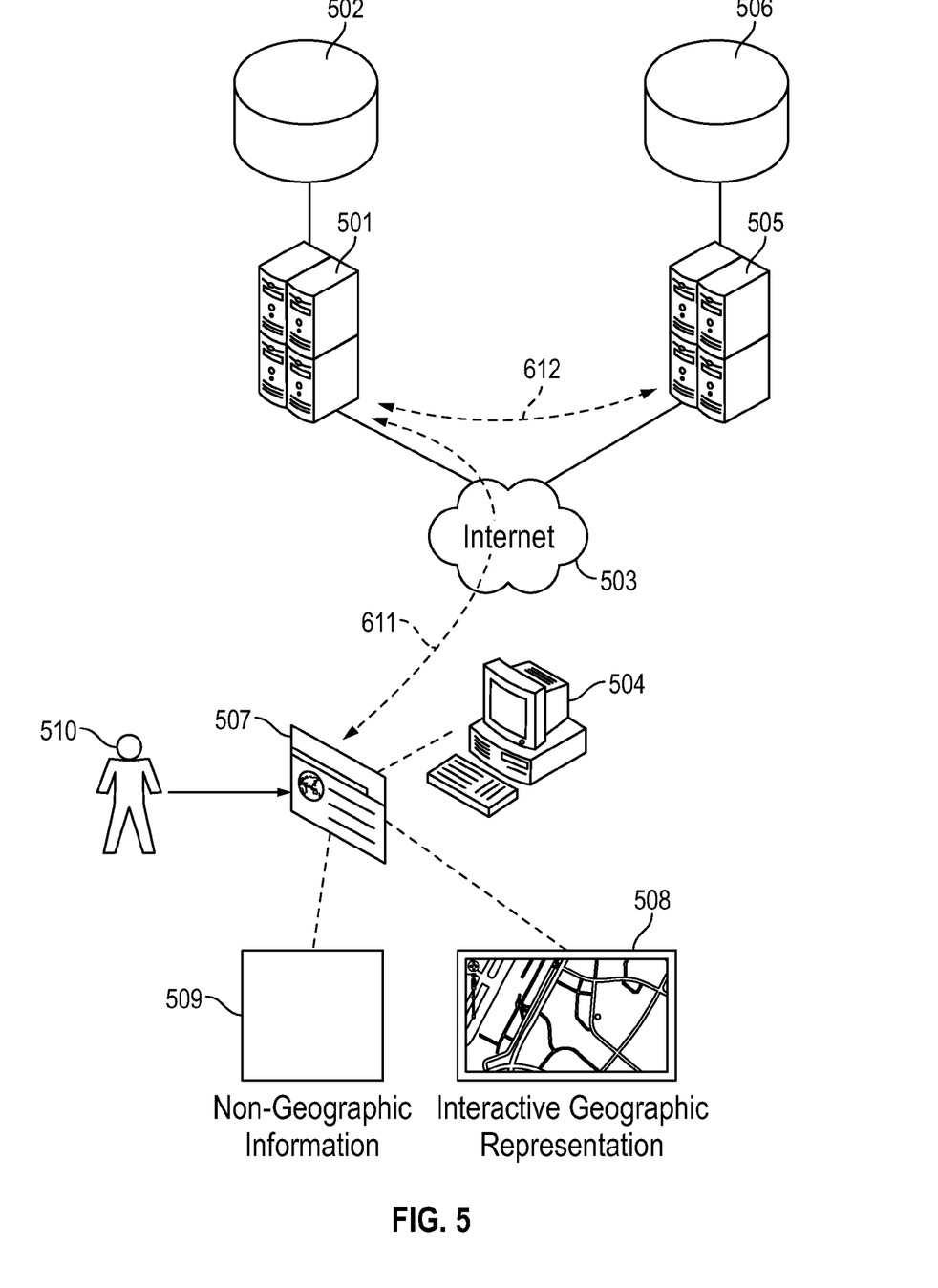
FIG. 5 is an exemplary diagram of a client-server system, including a user interface for display of an interactive map and non-geographic information, according to one aspect of the subject technology.

FIG. 5 is an exemplary diagram of a client-server system, including a user interface for display of an interactive map and non-geographic information, according to one aspect of the subject technology. In some aspects, the subject technology may include a first server 501 (or group of servers) in communication with a first database 502 (for example, for storing map information). First server 501 and first database 502 may be connected to and/or communicate with each other via a private local area network (or wide area network). First server 501 may be further connected via the Internet 503 to a client device 504 (for example, a personal computer, server, smart phone, PDA, tablet, or the like). In further aspects, the system may also include a second server 505 (or group of servers) in communication with a second database 506 (for example, for storing non-geographic local information). Second server 505 and second database 506 may be connected to and/or communicate with each other via a remote private LAN/WAN. Likewise, in one aspect, first server 501 and second server 505 may be connected to and/or communicate with each other via the remote private LAN/WAN or Internet 503. In some aspects, the various connections between first server 501, client device 504, second server 605, and/or the Internet or private LAN/WAN may be made over a wired or wireless connection. In some aspects, the functionality of first server 501 and second server 505 may be implemented on the same physical server or distributed among a plurality of servers. Similarly, the functionality of first database 502 and second database 506 may be implemented in the same database or distributed across a plurality of databases. Moreover, the databases may take any form such as relational databases, object-oriented databases, file structures, text-based records, or other forms of data repositories.

One or more servers (for example, first server 501 and/or second server 505) may be configured to communicate with a user interface 507 (for example, a web page displayed in a web browser) on client device 504. In this aspect, user interface 507 may be configured to (for example, in connection with viewing a website) display an interactive geographic representation 508 (for example, interactive map 204 or the like) received from server 501. Likewise, user interface 507 may also be configured to display (for example, on panel 205) non-geographic information 509 along a side of interactive geographic representation 508, or to superimpose the non-geographic information on the interactive map (for example, in the form of icons).

In one aspect, a first communication channel 510 is made between first server 501 and user interface 507 to convey an interactive geographic representation 508 of an area and/or non-geographic information 509 related to that area. First communication channel 510 may be uni-directional, or bi-directional in that it may, for example, also receive selections made by a user 511 in relation to user interface 507 and/or interactive geographic representation 508. In one aspect, user interface 507 may be a website viewed in a web browser, and displaying interactive geographic representation 508 may include redirecting a region of the browser to another location responsible for displaying interactive geographic representation 508. Redirection may be by domain redirection, a GET or POST command, and/or the like. In some aspects, geographic location data (for example, coordinates) is sent in connection with displaying and/or interacting with interactive geographic representation 508 (for example, as the result of panning an interactive map). The geographic location data may be requested from server 501 by user interface 507 using HTTP request/response, XMLHttpRequest (XHR), or the like.

In further aspects, server 501 may receive viewport information (for example, coordinates) from user interface 507 and then transmit the viewport information to second server 505 to receive location information (for example, a city corresponding to the received coordinates). In this regard, first server 501 may make a procedural call 512 to second server 505. The location information may be used by first server 501 to look up non-geographic information 509 from a service (for example, local information service 104) running on a third server 513.

FIG. 6 is a diagram illustrating an exemplary computerized system for displaying non-geographic information associated with an area of interest, including a processor and other internal components, according to one aspect of the subject technology. In some aspects, a computerized device 600 (for example, device 504, server 501, information processor 101, or client display terminal 102) includes several internal components such as a processor 601, a system bus 602, read-only memory 603, system memory 604, network interface 605, I/O interface 606, and the like. In one aspect, processor 601 may also be communication with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like. Alternatively, one or more external devices may include an electronic device such as a digital camera, a digital audio player, a digital video recorder, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 504. Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for updating non-geographic location information relating to a displayed geographic location in a viewport, comprising:
   providing for display, by one or more computing devices, non-geographic information related to a currently displayed point of interest in an interactive map;
   determining, by the one or more computing devices, that a user has repositioned the interactive map such that the repositioned interactive map is displayed in the viewport;
   automatically processing, by the one or more computing devices, an area represented by the repositioned interactive map displayed in the viewport, wherein the area represented by the repositioned interactive map includes a plurality of geographic entities that are respectively processed as a function of a predefined rule, wherein the predefined rule includes determining one or more of the population or geographic size of the plurality of geographic entities provided within the repositioned interactive map displayed in the viewport;
   automatically selecting, by the one or more computing devices, a new geographic point of interest from the plurality of geographic entities displayed and processed on the repositioned interactive map based on repositioning information received from the interactive map and the predefined rule, such that the new geographic point of interest is chosen as the geographic entity within the viewport having one or more of the largest population or largest geographic size;
   automatically determining, by the one or more computing devices, new non-geographic information related to the new geographic point of interest; and
   providing for display, by the one or more computing devices, the new non-geographic information related to the new geographic point of interest.

2. The computer-implemented method of claim 1, wherein determining the user has repositioned the interactive map includes determining the user has repositioned the interactive map by more than a predetermined amount.

3. The computer-implemented method of claim 1, wherein the new non-geographic information includes two or more items selected from the group consisting of local trends associated with the new geographic point of interest, information on businesses at or proximal to the new geographic point of interest, one or more photos associated with the new geographic point of interest, tourism information associated with the new geographic point of interest, and advertisements associated with the new geographic point of interest.

4. The computer-implemented method of claim 1, wherein determining the user has repositioned the interactive map includes determining a GPS-enabled device has moved from a first geographic location to a second geographic location.

5. The computer-implemented method of claim 1, wherein the information received from the interactive map includes one or more coordinates.

6. The computer-implemented method of claim 5, wherein the one or more coordinates includes a coordinate representative of a geographic location at the center of a viewport in which the interactive map is displayed.

7. The computer-implemented method of claim 1, wherein automatically determining new non-geographic information related to the new geographic point of interest comprises automatically determining new non-geographic information related to an area surrounding the new geographic point of interest.

8. The computer-implemented method of claim 7, wherein the area surrounding the new geographic point of interest is bounded by an edge of the interactive map.

9. A non-transitory machine-readable medium including machine-executable instructions stored thereon, which when executed by a machine or computer-enabled device, cause the machine or computer-enabled device to perform a method of updating non-geographic location information relating to a geographic location in a displayed interactive map, the method comprising:
   providing for display, the interactive map, and non-geographic information related to a current point of interest in the interactive map;
   determining the interactive map has been repositioned such that the repositioned interactive map is displayed in a viewport;
   on determining the interactive map has been repositioned more than a predetermined amount, automatically processing a displayed area represented by the repositioned interactive map, wherein the displayed area represented by the repositioned interactive map includes a plurality of geographic entities that are respectively processed as a function of a predefined rule, wherein the predefined rule includes determining an attribute of the plurality of geographic entities provided within the repositioned interactive map displayed in the viewport;
   automatically selecting one or more new points of interest from the plurality of geographic entities displayed on and processed in the repositioned interactive map based on the displayed area and the predefined rule, such that the one or more new points of interest are chosen as geographic entities within the viewport having a value for the attribute that is greater than the average value of that attribute taken over the plurality of geographical entities displayed in the viewport;
   automatically determining new non-geographic information related to the one or more new points of interest; and providing to the user interface, updated non-geographic information based on the one or more new points of interest.

10. The machine-readable medium of claim 9, wherein determining the interactive map has been repositioned includes determining a user has repositioned the interactive map by more than a predetermined amount.

11. The machine-readable medium of claim 9, wherein the predefined rule additionally determines a location closest to a center of a viewport in which the interactive map is displayed, and uses the determined location as part of automatically selecting one or more new points of interest.

12. The machine-readable medium of claim 9, wherein the predefined rule additionally determines a location with the largest population relative to other locations in the displayed interactive map, and uses the determined location as part of automatically selecting one or more new points of interest.

13. The machine-readable medium of claim 9, wherein the predefined rule additionally determines a location having the largest square miles relative to other locations in the displayed interactive map, and uses the determined location as part of automatically selecting one or more new points of interest.

14. The machine-readable medium of claim 9, wherein the updated non-geographic information is retrieved from a storage location based on one or more coordinates associated with the one or more new points of interest.

15. The machine-readable medium of claim 9, wherein the interactive map is repositioned in response to movement of a GPS-enabled device from a first geographic location to a second geographic location.

16. The machine-readable medium of claim 9, wherein automatically determining new non-geographic information related to the one or more new points of interest comprises automatically determining new non-geographic information related to an area surrounding the one or more new points of interest.

17. The machine-readable medium of claim 9, wherein the updated non-geographic information includes two or more items selected from the group consisting of local trends associated with the one or more new points of interest, information on businesses at or proximal to the one or more new points of interest, one or more photos associated with the one or more new points of interest, tourism information associated with the one or more new points of interest, and advertisements associated with the one or more new points of interest.

18. The machine-readable medium of claim 9, wherein the attribute comprises one or more of population, geographic size, population density, business or building density, number or density of tourism spots, traffic trends, and number of advertisements associated with one or more locations viewed.

* * * * *